(12) United States Patent
Van Boxtel et al.

(10) Patent No.: US 8,182,029 B2
(45) Date of Patent: May 22, 2012

(54) OPEN ROOF CONSTRUCTION FOR A VEHICLE

(75) Inventors: Eduardus Christianus Henricus Van Boxtel, Zeeland (NL); Peter Christiaan Leonarus Johannes Manders, Horst (NL); Marcel Johan Christiaan Nellen, Merselo (NL); Sander De Bie, Nuth (NL)

(73) Assignee: Inalfa Roof Systems Group B.V., Venray (NL)

( * ) Notice: Subject to any disclaimer, the term of this patent is extended or adjusted under 35 U.S.C. 154(b) by 0 days.

(21) Appl. No.: 12/814,615

(22) Filed: Jun. 14, 2010

(65) Prior Publication Data

US 2010/0314913 A1    Dec. 16, 2010

(30) Foreign Application Priority Data

Jun. 16, 2009   (EP) .................................... 09162866

(51) Int. Cl.
*B60J 7/043*    (2006.01)
(52) U.S. Cl. .................... 296/216.03; 296/222; 296/223
(58) Field of Classification Search ........... 296/216.02–216.05, 222, 223
See application file for complete search history.

(56) References Cited

U.S. PATENT DOCUMENTS

| 4,601,512 | A |   | 7/1986 | Boots |
| 5,028,090 | A |   | 7/1991 | Huyer |
| 5,058,947 | A | * | 10/1991 | Huyer ..................... 296/216.03 |
| 5,092,651 | A |   | 3/1992 | Baldwin |
| 6,174,024 | B1 | * | 1/2001 | Kronseder et al. ....... 296/216.03 |

FOREIGN PATENT DOCUMENTS

| DE | 102005059285 | 6/2007 |
| EP | 0343750 | 11/1989 |
| GB | 2140500 | 11/1984 |

OTHER PUBLICATIONS

Official Search Report of the European Patent Office in counterpart foreign application No. EP 09162866.9 filed Jun. 16, 2009.

* cited by examiner

*Primary Examiner* — Dennis Pedder
(74) *Attorney, Agent, or Firm* — Steven M. Koehler; Westman, Champlin & Kelly, P.A.

(57) ABSTRACT

An open roof construction for a vehicle is disclosed. The open roof construction includes a panel movable between a closed position and a raised or tilted position via operation of a tilting lever and an auxiliary lever. In illustrated embodiments, the tilting lever includes a follower movable along a guide curve to lift a rear end of the panel from the closed position to a raised position. The auxiliary lever provides auxiliary lift to the tilting lever when the follower reaches an opened end of the guide curve. As disclosed, the auxiliary lift lever rotates from a lowered position to an upright position which in illustrated embodiments is generally perpendicular to a stationary roof part to provide additional lift to the tilting lever.

20 Claims, 5 Drawing Sheets

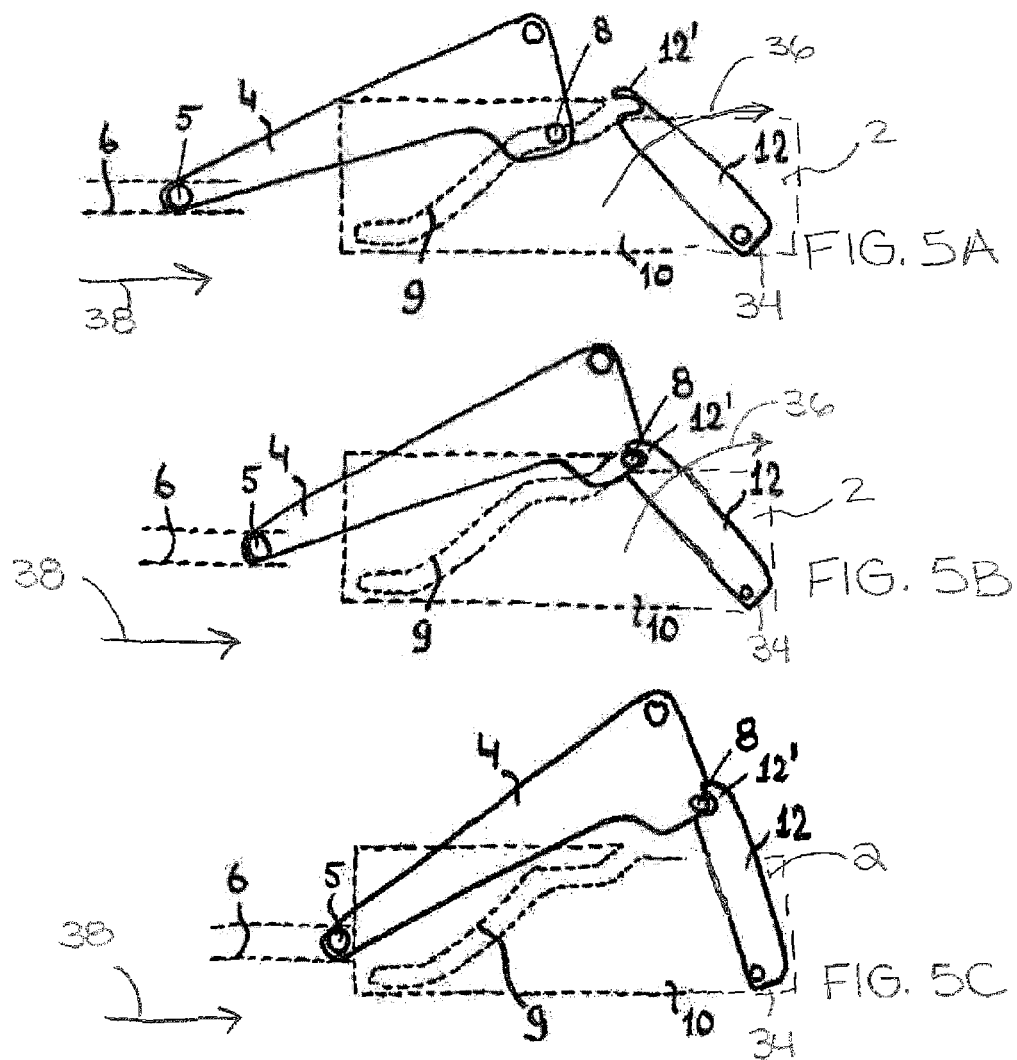

OPEN ROOF CONSTRUCTION FOR A VEHICLE

BACKGROUND

The discussion below is merely provided for general background information and is not intended to be used as an aid in determining the scope of the claimed subject matter.

Aspects of the invention relate to an open roof construction for a vehicle, comprising a roof opening defined in a stationary roof part of the vehicle and a movable panel for opening and closing said roof opening, of which panel the rear end, as viewed in the longitudinal direction of the car, can be moved upward and downward by a moving mechanism comprising at least a tilting lever having a first end slideably and rotatably engaging the stationary roof part and an opposite second end rotatably engaging the panel, wherein the first end of the tilting lever is drivable by a drive mechanism for its sliding motion relative to the stationary roof part and wherein the tilting lever for realising its rotational movement comprises a follower positioned between its first and second ends cooperating with a guide curve.

For realising a sufficient upward movement of the rear end of the panel a moving mechanism is required with a certain constructive height. For a given upward movement said constructive height limits the effective opening dimension of the panel. Specifically the range of movement of the tilting lever will be defined by the vertical dimension of the guide curve.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

As one aspect, an open roof construction or roof assembly is includes a guide curve with an open end at which the follower can leave the guide curve when the rear end of the panel has moved upward a certain distance and wherein the moving mechanism further comprises an auxiliary lever having a first end rotationally engaging the stationary roof part and an opposite second end adapted for rotationally engaging the tilting lever at an engagement location at least when the follower leaves the guide curve and for carrying out then such a rotating movement around its first end that the rotational movement of the tilting lever is continued after the follower has left the guide curve.

Until the moment that the follower will leave the guide curve, the moving mechanism operates quite in a conventional manner according to which the guide curve defines the position of the follower and, thus, of the tilting lever. Until this moment the auxiliary lever has no influence on the movement of the tilting lever. However, when the follower of the tilting lever has left the guide curve the auxiliary lever has taken over control over the further movement of the tilting lever. Specifically the auxiliary lever rotates around its first end from an inclined position towards a more upright position, which results in an effective upward movement of its second end and therefore of the engagement location and, consequently, an additional tilting of the tilting lever. In its inoperative position (when the follower of the tilting lever still is positioned within the guide curve) the auxiliary lever does not project above the guide curve and therefore does not lead to an increase of the effective constructive height ("packaging") of the open roof construction notwithstanding the increase of the achieved tilting of the tilting lever.

In accordance with an embodiment of the open roof construction or roof assembly, the position of the engagement location on the tilting lever is such that in the maximal upward position of the rear end of the panel the second end of the tilting lever, the engagement location and the first end of the auxiliary lever are substantially positioned on a straight line extending substantially perpendicularly to the stationary roof part.

Such a disposition results in a very effective load transmission between the panel and the stationary roof part with minimised play and oscillations of the open roof construction, even under severe conditions.

Notwithstanding the above the open roof construction may be devised such that the auxiliary lever moves beyond the position in which the second end of the tilting lever, the engagement location and the first end of the auxiliary lever are substantially positioned on a straight line extending substantially perpendicularly to the stationary roof part. This enables the panel to move downward a little after having reached its uppermost position.

In one embodiment of the open roof construction or roof assembly, the engagement location defines a permanent hinged connection between the tilting lever and the second end of the auxiliary lever, wherein the first end of the auxiliary lever is received slideably in a guideway of the stationary roof part and wherein the guideway is provided with a stop preventing a further sliding movement of the first end of the auxiliary lever when the follower has reached the open end of the guide curve.

In such an embodiment the auxiliary lever is permanently connected to and always moves along with the tilting lever, but only will become effective when the follower is to leave the guide curve and when, simultaneously, its second end engages said stop of the guide way.

In an alternative embodiment, however, of the open roof construction or roof assembly, the first end of the auxiliary lever is connected to the stationary roof part by a fixed hinge, wherein the engagement location defines a temporary hinged connection between the tilting lever and the second end of the auxiliary lever.

In this embodiment the auxiliary lever does not engage nor moves along with the tilting lever as long as the follower cooperates with the guide curve. Only when the follower is to leave the guide curve, the second end of the auxiliary lever will engage the tilting lever at the engagement location for realising the further tilting movement of the tilting lever. It is conceivable, for example, that said second end of the auxiliary lever comprises a fork cooperating with a corresponding pin of the tilting lever (which even might be the follower).

When the auxiliary lever and stationary roof part comprise cooperating locking elements for locking the position of the auxiliary lever in the maximal upward position of the rear end of the panel, the open roof construction or roof assembly will have a very stable position then.

For example the auxiliary lever may comprise a locking finger cooperating with a respective part of the guideway. Such a locking finger may be passive, but also may be active and be driven by a drive mechanism or, for example, by the drive mechanism of the tilting lever, such as a drive cable. Finally, it is conceivable that the second end of the tilting lever is slideable relative to the panel. This offers the possibility of sliding the panel after being tilted.

BRIEF DESCRIPTION OF THE DRAWINGS

FIGS. 5A-5C schematically illustrate an alternate embodiment of an open roof construction including a lifting lever and an auxiliary lever for operating a roof panel of the open roof construction.

DETAILED DESCRIPTION OF THE ILLUSTRATIVE EMBODIMENT

Figure 1:
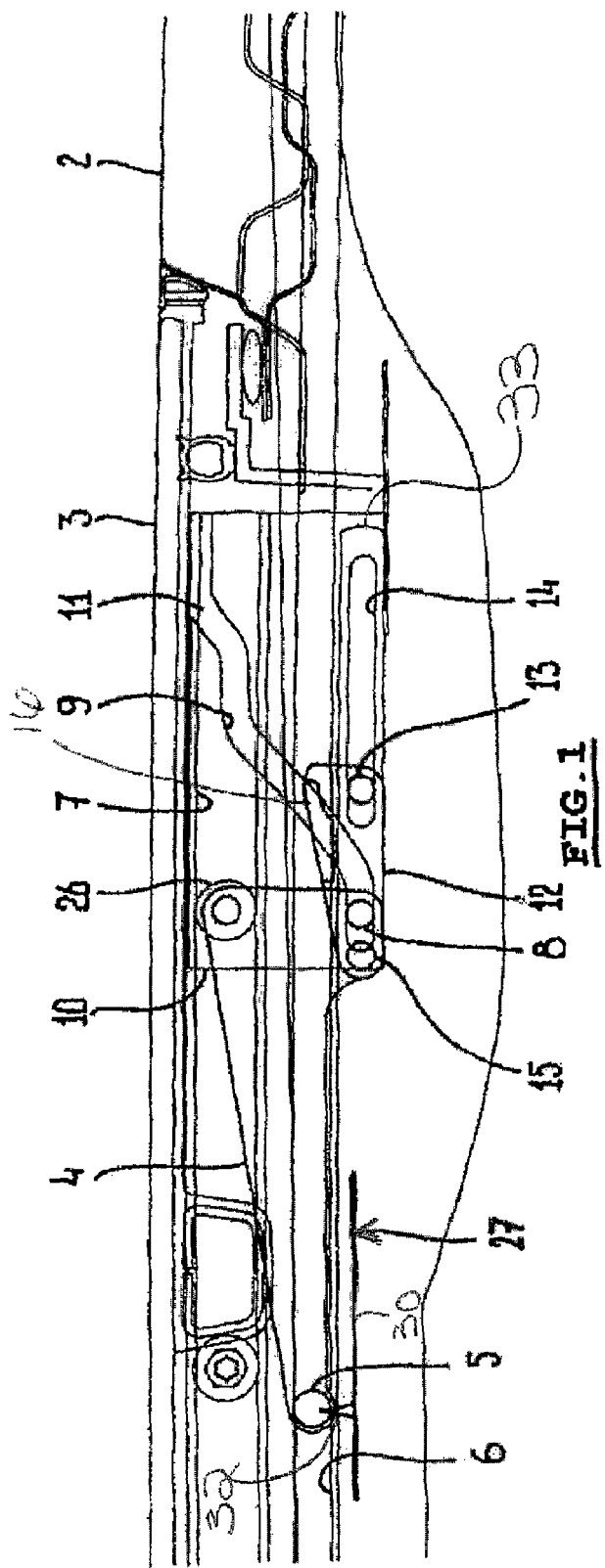
FIGS. 1-4 schematically show an embodiment of an open roof construction including a lifting lever and an auxiliary lever for operating a roof panel of the open roof construction.

Firstly referring to FIG. 1 an embodiment of an open roof construction for a vehicle is illustrated in the fully closed position. The open roof construction comprises a roof opening 1 (best seen in FIGS. 2-4) defined in a stationary roof part 2 of the vehicle. A roof assembly mounted to the stationary roof part 2 includes a movable panel 3 and associated mechanism adapted for opening and closing said roof opening 1. Of said panel 3 the rear end, as viewed in the longitudinal direction of the car (and in the figures to the right), can be moved upward and downward by a moving mechanism to be described next.

Apart from this movement of its rear end, the panel 3 also may carry out other movements, such as, for example, an upward and downward movement of its leading end and a sliding movement substantially in parallel to the upper (outer) side of the stationary roof part 2.

A moving mechanism for the panel 3 comprises a tilting lever 4 having a first end provided with a slide shoe 5 (or roller) slideably and rotatably engaging a guide rail 6 of the stationary roof part 2 being attached thereto or formed therein. A drive mechanism 27 is coupled to the tilting lever 4 (via the slide shoe 5 to slideable move the tilting lever 4 along the guide rail 6 of the stationary roof part 2. In the illustrated embodiment, the drive mechanism 27 includes a drive cable 30 coupled to the tilting lever 4 or slide shoe 5 through connector 32. Although a particular drive mechanism is shown, application is not limited to a drive mechanism including a drive cable 30 as shown and other drive mechanisms can be used to move the slide shoe 5 of the tilting lever 4 along the guide rail 6 of the stationary roof part 2.

The opposite second end of the tilting lever 4 likewise comprises a slide shoe 26 (or roller) slideably and rotatably engaging a guide rail 7 of the panel 3.

Between its first and second ends the tilting lever 4 comprises a follower (e.g. guide pin) 8 cooperating with a guide curve 9 which (in the exemplary illustrated embodiment) is part of a guide piece 10 that is attached to the stationary roof part 2. The guide curve 9 has an open end 11 at which the follower 8 can leave the guide curve 9 when the rear end of the panel 3 has moved upward a certain distance, as will be explained later.

The moving mechanism further comprises an auxiliary lever 12 having a first end provided with a slide shoe (or roller) 13 rotationally and slideably engaging a guideway 14 defined in the guide piece 10. An opposite second end of the auxiliary lever 12 rotationally engages the tilting lever 4 by means of a hinged connection 15 or other equivalent means.

Figure 2:
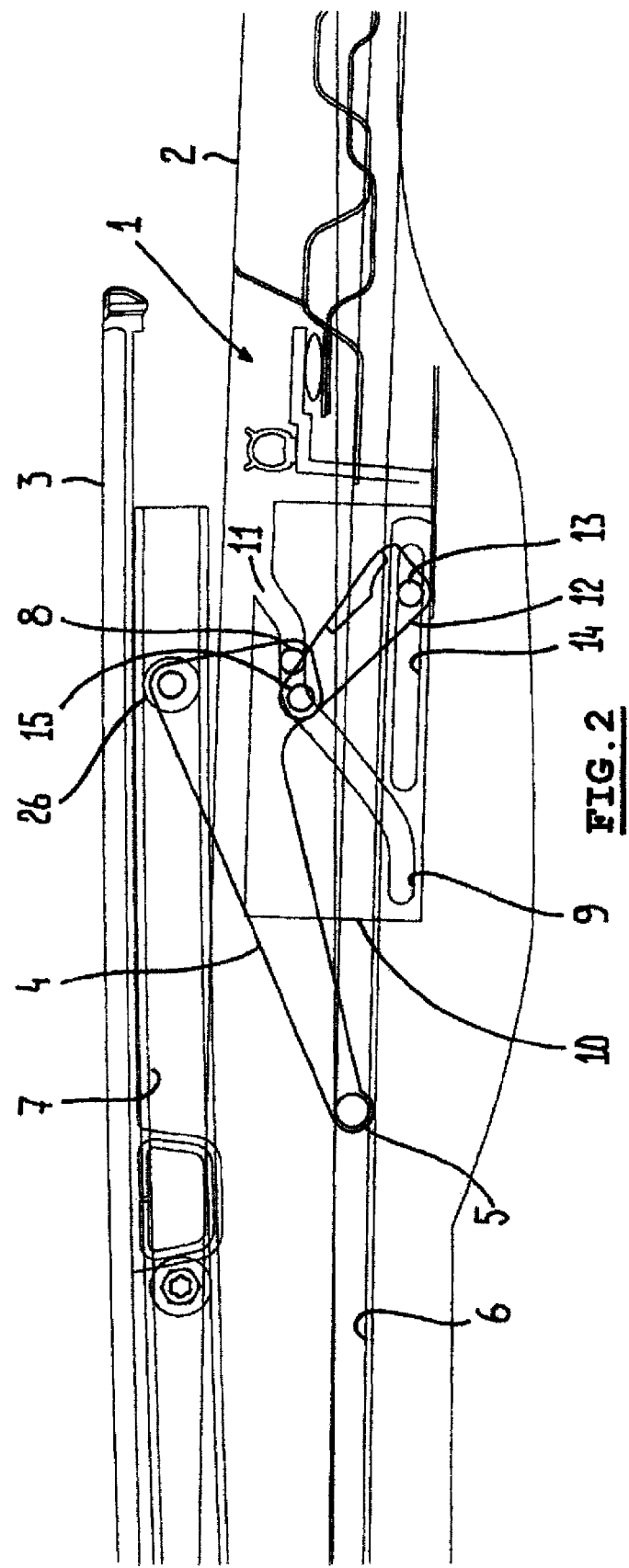
Figure 3:
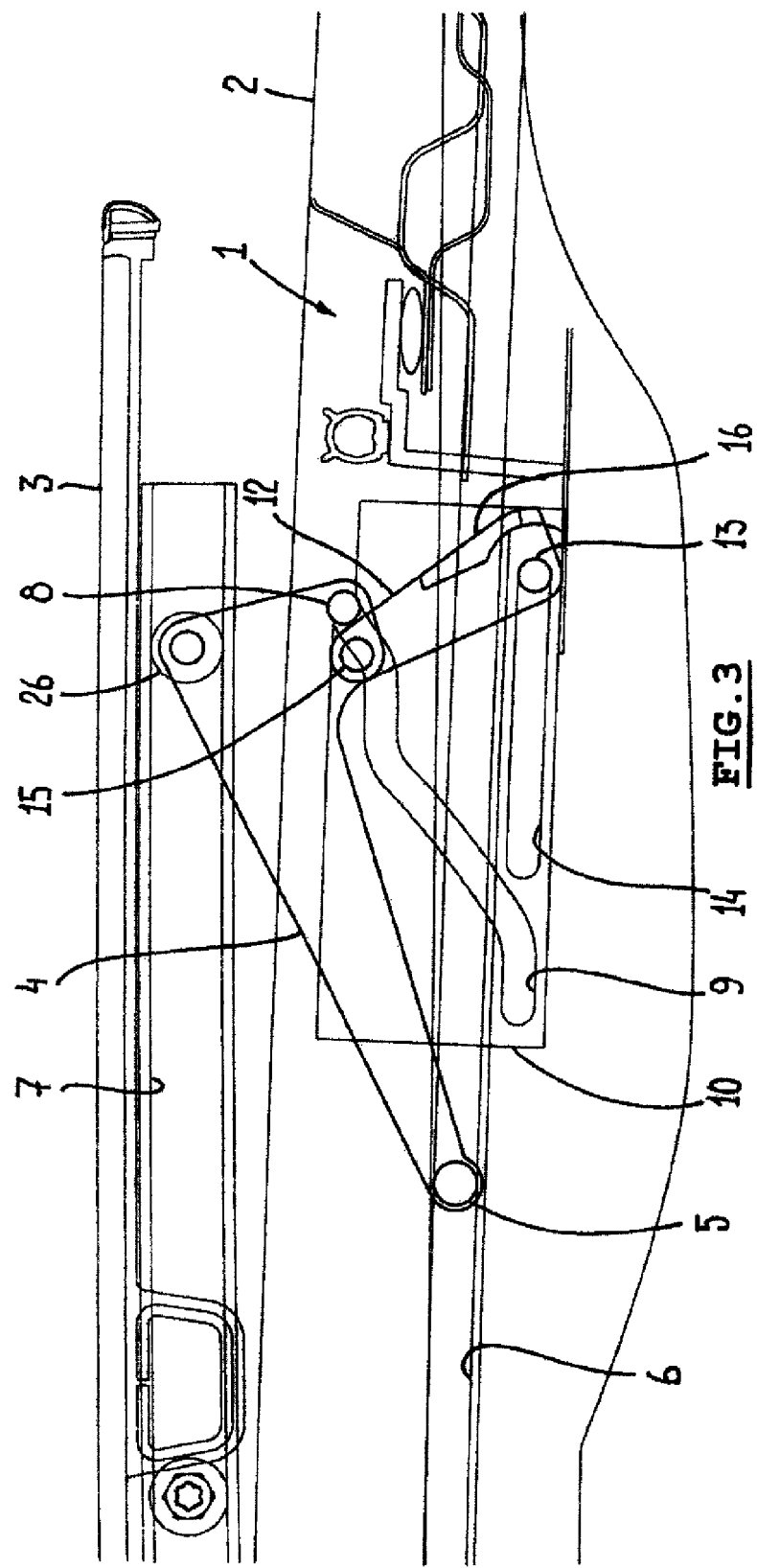

In FIG. 1 the panel 3 is fully closed. Follower 8 is located near to the left lowermost end of the guide curve 9, whereas guide shoe 13 of the auxiliary lever is located near the leftmost part of the guideway 14. By activating the drive mechanism (e.g. drive cable) slide shoe 5 is moved to the right along guide rail 6. As a result the follower 8 moves upward (rotating the lever 4) and to the right along guide curve 9 which results in lifting the rear edge of the panel 3 (FIG. 2).

The movement of the follower 8 also causes a movement of the auxiliary lever 12 of which the guide shoe 13 slides to the right along guideway 14 and which rotates at the same time.

Figure 4:
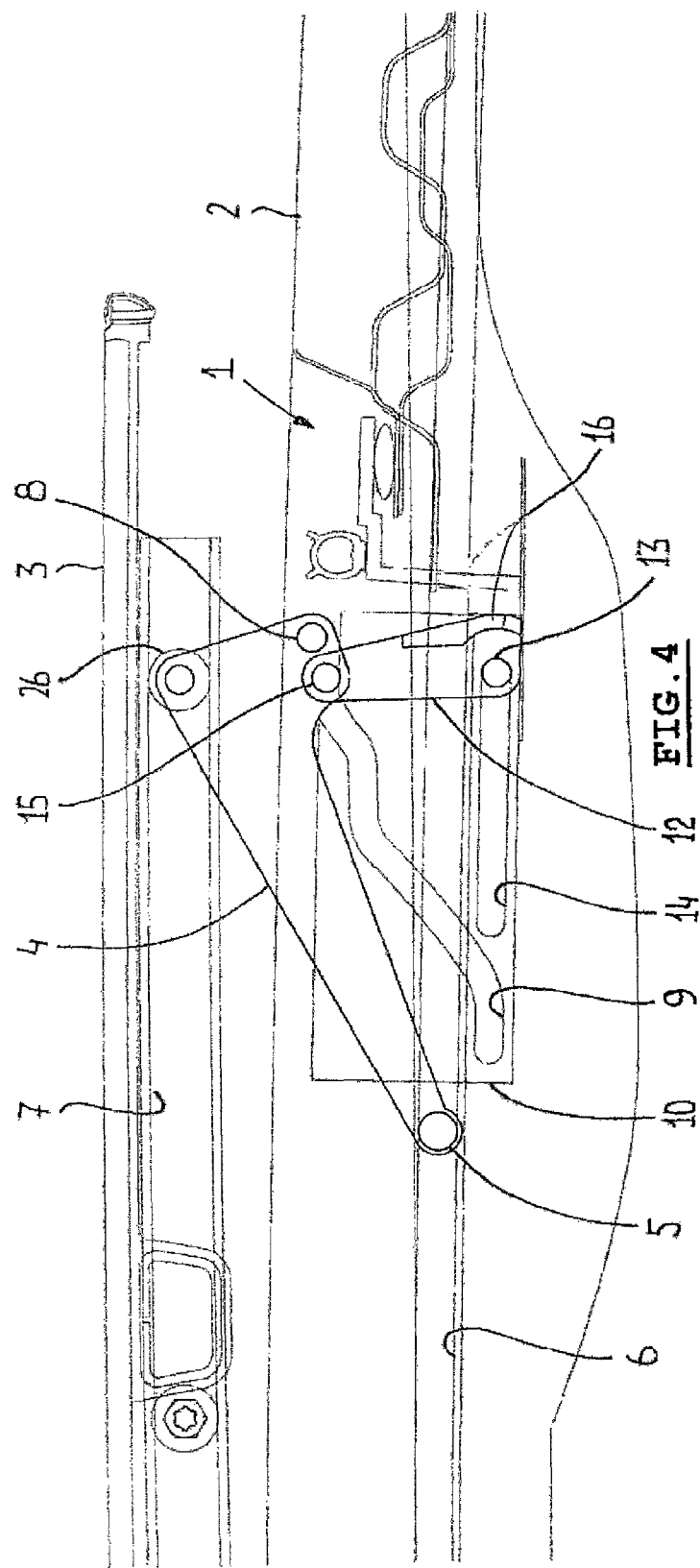

When the follower 8 leaves the guide curve 9 at the end 11 thereof (FIG. 3) the auxiliary lever 12 has reached a position in which its slide shoe 13 abuts the end of the guideway 14, such that the auxiliary lever 12 only can rotate around the slide shoe 13, which rotation results in the rotational movement of the tilting lever 4 being continued after the follower 8 has left the guide curve 9 (FIG. 4). Thus the rear edge of the panel 3 is lifted still further.

The construction may be such that slide shoe 13 already has reached its rightmost end position in guideway 14 before follower 8 has left the guide curve 9. In such instance the end 11 of the guide curve 9 defines an arc of a circle with slide shoe 13 as center.

The position of the hinged connection 15 on the tilting lever 4 is such that in the maximal upward position of the rear end of the panel 3 as illustrated in FIG. 4, the slide shoe 26 of the tilting lever 4, the hinged connection 15 and the slide shoe 13 of the auxiliary lever 12 are substantially positioned on a straight line extending substantially perpendicularly to the stationary roof part 2 or guide rail 6.

The auxiliary lever 12 comprises a locking finger 16 cooperating with a fixed part 33 of the guideway 14 or other part of the stationary roof part 2 defining locking elements for locking the position of the auxiliary lever 12 in the maximal upward position (or equivalent end position) of the rear end of the panel 3 as shown in FIG. 4. In the horizontal orientation locking finger 16 is not engaged relative to the fixed part 33 as shown in FIG. 1. As the auxiliary lever 12 rotates to the vertical orientation, the locking finger 16 engages fixed part 33 (shown in FIG. 1) of the guideway 14 to restrict rotation of the auxiliary lever 12 to maintain the vertical orientation of the auxiliary lever 12.

FIGS. 5A-5C illustrate an alternate embodiment of a moving mechanism for raising or tilting the rear end of the panel 3 (not shown in FIGS. 5A-5C) where like number refer to like parts in the previous FIGS. 1-4. In the embodiment shown, the first end of the auxiliary lever 12 is rotatonally connected to the stationary roof part 2 via fixed hinge 34. As illustrated by arrow, 36, the second end of the auxiliary lever 12 moves along an arcuate path as comparatively illustrated in FIGS. 5A-5C via rotation of the auxiliary lever 12 about the fixed hinge 34. As shown in FIGS. 5A-5C, the second end of the auxiliary lever 12 includes a fork 12' at an end thereof. As shown in FIG. 5A, the auxiliary lever 12 is positioned at an incline angle relative to the stationary roof part 2. As previously described and illustrated in FIG. 5B, as the drive mechanism (not shown in FIGS. 5A-5C) moves slide shoe 5 along guide rail 6 in a direction illustrated by arrow 38, the follower or guide pin 8 moves along guide curve 9 to raise the tilting lever 4.

In the position indicated in FIG. 4 the panel 3 may slide to the right during which movement the slide shoe 26 slides in the guide rail 7. Such a sliding movement of the panel 3 may be caused by any appropriate means known per se and such as but not limited to drive cables not illustrated here.

Although the subject matter has been described in language directed to specific environments, structural features and/or methodological acts, it is to be understood that the subject matter defined in the appended claims is not limited to the environments, specific features or acts described above as has been held by the courts. Rather, the environments, specific features and acts described above are disclosed as example forms of implementing the claims. For instance, a slide shoe, follower, roller and guide pin define elements with an equivalent function which may be devised in many ways (engaging a corresponding guiding element internally or externally).

What is claimed is:

1. An open roof construction for a vehicle, comprising:
a panel movable relative to a roof opening of the vehicle;
a moving mechanism configured to move a rear end of the panel between a raised position and a lowered position relative to the roof opening, the moving mechanism comprising at least a tilting lever having a first end slideably and rotatably engaging a stationary roof part and a second opposite end rotatably engaging the panel;
a drive mechanism operably coupled to the first end of the tilting lever to slideably move the tilting lever relative to the stationary roof part and wherein the tilting lever comprises a follower positioned between its first and second ends cooperating with a guide curve, wherein the guide curve has an open end at which the follower can leave the guide curve when the rear end of the panel has moved upward a certain distance; and
an auxiliary lever having a first end rotationally coupled to the stationary roof part and an opposite second end engaged with the tilting lever at least when the follower leaves the guide curve wherein the drive mechanism moves along a guide rail to impart rotation to the auxiliary lever about its first end to rotate the auxiliary lever from a horizontal orientation to another orientation located at an angle relative to the horizontal orientation to apply lift to the panel through the engagement of the auxiliary lever with the tilting lever.

2. The open roof construction according to claim 1, wherein the auxiliary lever is coupled to the tilting lever via a hinged connection and wherein the first end of the auxiliary lever is received slideably in a guideway of the stationary roof part and wherein the guideway is provided with a stop preventing a further sliding movement of the first end of the auxiliary lever when the follower has reached the open end of the guide curve.

3. The open roof construction according to claim 1 wherein the first end of the auxiliary lever is connected to the stationary roof part by a fixed hinge and the second end of the auxiliary lever includes a fork to engage the follower on the tilting lever when the follower leaves the guide curve to impart lift to the tilting lever via rotation of the auxiliary lever relative to the fixed hinge via operation of the drive mechanism.

4. The open roof construction according to claim 1, wherein the auxiliary lever and the stationary roof part comprise cooperating locking elements adapted to lock the position of the auxiliary lever in a generally vertical orientation to maintain the roof panel in the raised position.

5. The open roof construction according to claim 4, wherein the locking elements comprises a locking finger on the auxiliary lever cooperating with a fixed part of the stationary roof part.

6. The open roof construction according to claim 1, wherein the follower is a guide pin.

7. The open roof construction according to claim 1 wherein the drive mechanism coupled to the tilting lever comprises a drive cable.

8. The open roof construction according to claim 1 wherein the second end of the tilting lever is slideable relative to the panel.

9. A roof assembly for a vehicle having a roof opening in a roof, the roof assembly comprising:
a panel movable relative to the roof opening;
a moving mechanism configured to move a rear end of the panel between a lowered position and a raised position with respect to the roof opening, the moving mechanism comprising at least a tilting lever having a first end slideably and rotatable engaging a stationary roof part and an opposite end rotatably engaging the panel;
a drive mechanism operably coupled to the first end of the tilting lever to slide or move the tilting lever relative to the stationary roof part and wherein the tilting lever comprises a follower slideable along a guide curve via operation of the drive mechanism, wherein the guide curve has an open end at which the follower can leave the guide curve when the rear end of the panel has moved upward a certain distance; and
an auxiliary lever having a first end rotationally connected to the stationary roof part via a fixed hinge and a second end including a fork configured to engage the follower connected to the tilting lever when the follower has left the guide curve wherein operation of the drive mechanism rotates the auxiliary lever about the fixed hinge to impart lift to the panel through the auxiliary lever.

10. The roof assembly of claim 9, wherein in the raised position of the rear end of the panel, the second end of the tilting lever, the second end of the auxiliary lever engaged with the follower and the first end of the auxiliary lever are substantially positioned on a straight line.

11. The roof assembly according to claim 9, wherein the drive mechanism coupled to the first end of the tilting lever comprises a drive cable.

12. The roof assembly according to claim 9, wherein the second end of the tilting lever is slideable relative to the panel.

13. A roof assembly for a vehicle having a roof opening in a roof, the roof assembly comprising:
a panel movable relative to the roof opening;
a moving mechanism configured to move a rear end of the panel from a lowered position to a raised position, the moving mechanism comprising at least a tilting lever formed of a generally triangular shaped body comprising three corner portions wherein a first corner portion of the tilting lever includes a shoe slideable along a guide rail of a stationary roof part, a second corner portion engages the panel and a third corner portion includes a follower slideable along a guide curve;
a drive mechanism operably coupled to the shoe to move the tilting lever relative to the stationary roof part to slideably move the follower along the guide curve wherein the guide curve has an open end at which the follower can leave the guide curve when the rear end of the panel has moved upward a certain distance; and
an auxiliary lever having a first end rotationally coupled to the stationary roof part and an opposite second end engaged to the third corner portion of the tilting lever at least when the follower of the tilting lever leaves the guide curve wherein the drive mechanism rotates the auxiliary lever relative to the first end to apply lift to the panel through the tilting lever.

14. The roof assembly of claim 13 wherein the guide curve is formed along the stationary roof part.

15. The roof assembly of claim 13 wherein when the follower leaves the guide curve movement of the drive mechanism imparts rotation to the auxiliary lever about its first end to rotate the auxiliary lever from a horizontal orientation to a vertical orientation generally perpendicular to the stationary roof part.

16. The roof assembly of claim 15 wherein the first end of the auxiliary lever includes a guide shoe movable along a guideway in the stationary roof portion and when the slide shoe abuts an end of the guideway further movement of the drive mechanism rotates the auxiliary lever about the first end of the auxiliary lever.

17. The roof assembly of claim 13 wherein the first end of the auxiliary lever is fixed to the stationary roof portion and the second end of the auxiliary lever includes a fork configured to engage the follower on the tilting lever.

18. The roof assembly of claim 13 wherein in the raised position, the second and third corner portions of the tilting lever and the first end of the auxiliary lever are generally aligned in a straight line.

19. The roof assembly of claim 1 wherein the guide curve is formed along the stationary roof part.

20. The roof assembly of claim 9 wherein the guide curve is formed along the stationary roof part.

* * * * *